US00RE42874E

(19) United States
(12) Reissued Patent
Sidwell

(10) Patent Number: US RE42,874 E
(45) Date of Reissued Patent: Nov. 1, 2011

(54) BALLOON AND ROD CONNECTOR COMBINED WITH THE ROD

(75) Inventor: Paul E. Sidwell, Duluth, GA (US)

(73) Assignee: Maximum Visibility Solutions, LLC, Alachua, FL (US)

() Term: 14 Years**

(21) Appl. No.: 29/322,997

(22) Filed: Aug. 15, 2008

Related U.S. Patent Documents

Reissue of:
(64) Patent No.: Des. 529,102
Issued: Sep. 26, 2006
Appl. No.: 29/228,733
Filed: Apr. 28, 2005

U.S. Applications:
(62) Division of application No. 29/286,205, filed on Apr. 27, 2007, now Pat. No. Re. 41,056.

(51) LOC (9) Cl. ..... 21-01
(52) U.S. Cl. ..... D21/453; D20/40
(58) Field of Classification Search ..... D21/438–440, D21/453, 454; D11/117–130, 146, 164; D8/373, 382, 383, 394, 395, 396; D20/42, D20/43; 446/220–226; 40/212, 214, 591, 40/592, 606.01, 606.03, 606.11, 606.12, 40/607.1, 607.11; 428/7–9, 12, 23, 27, 31; 24/30.5, 543, 545, 555, 570; 211/13.1, 60.1, 211/89.01; 116/28 R, 30, 210, DIG. 8, DIG. 9
See application file for complete search history.

(56) References Cited

U.S. PATENT DOCUMENTS 2,882,645 A * 4/1959 Stivers ..... 446/220
(Continued)

FOREIGN PATENT DOCUMENTS

EP 105179 A1 * 4/1984
(Continued)

*Primary Examiner* — Catherine Tuttle
(74) *Attorney, Agent, or Firm* — Saliwanchik, Lloyd & Eisenschenk

(57) CLAIM

The ornamental design for a balloon and rod connector combined with the rod, as shown and described.

DESCRIPTION

*Notice: More than one reissue application has been filed for the reissue of U.S. Design Pat. No. D529,102. The reissue applications are 29/322,997(the present application), which is a divisional of application Ser. No. 29/286,205, which was a reissue of U.S. Pat. No. D529,102.*

[FIG. 1 is a perspective view showing my new design with the rod portion removed for a clear disclosure of the end configuration;]
[FIG. 2 is a reduced scale front elevational view thereof;]
[FIG. 3 is a rear elevational view thereof;]
[FIG. 4 is a left side elevational view thereof;]
[FIG. 5 is a right side elevational view thereof;]
[FIG. 6 is top view thereof;
[FIG. 7 is a bottom view thereof; and,]
[FIG. 8 is an enlarged scale perspective view of the cross section along line 8-8 of FIG. 3.]
*FIG. 9 is a perspective view showing a second embodiment of my new design without the inner liner cup and with the rod portion removed for a clear disclosure of the end configuration;*
*FIG. 10 is a reduced scale front elevational view thereof;*
*FIG. 11 is a rear elevational view thereof;*
*FIG. 12 is a left side elevational view thereof;*
*FIG. 13 is a right side elevational view thereof;*
*FIG. 14 is top view thereof; and,*
*FIG. 15 is a bottom view thereof.*
*The broken lines are included for the purpose of illustrating portions of the balloon and rod connector combined with the rod that form no part of the claimed design.*

1 Claim, 6 Drawing Sheets

Matter enclosed in heavy brackets [ ] appears in the original patent, but forms no part of this reissue; matter printed in italics indicates the additions made by reissue.

U.S. PATENT DOCUMENTS

| | | | | | |
|---|---|---|---|---|---|
| 3,267,604 | A | * | 8/1966 | Goldsmith | 446/222 |
| 4,661,081 | A | * | 4/1987 | Basseches | 446/220 |
| 4,715,841 | A | * | 12/1987 | Nelson et al. | 446/222 |
| 4,729,749 | A | * | 3/1988 | Milne | 446/222 |
| 4,737,133 | A | * | 4/1988 | Neumeier | 446/397 |
| 4,837,059 | A | * | 6/1989 | Milne | 428/12 |
| 4,879,823 | A | * | 11/1989 | Collins | 40/124.01 |
| 4,895,545 | A | * | 1/1990 | Nelson | 446/220 |
| 5,021,022 | A | * | 6/1991 | Ganz | 446/220 |
| D329,261 | S | * | 9/1992 | Pollack | D21/440 |
| 5,203,530 | A | * | 4/1993 | Liu | 248/309.1 |
| 5,295,891 | A | * | 3/1994 | Schalk | 446/222 |
| 5,395,276 | A | * | 3/1995 | Valentino | 446/217 |
| D360,844 | S | * | 8/1995 | Miller et al. | D10/110 |
| 5,444,607 | A | * | 8/1995 | Dreyfuss | 362/352 |
| 6,176,758 | B1 | * | 1/2001 | Wu | 446/224 |
| 6,375,534 | B1 | * | 4/2002 | Burns | 446/220 |
| 6,575,806 | B1 | * | 6/2003 | Nelson et al. | 446/222 |
| 6,969,295 | B1 | * | 11/2005 | Sidwell | 446/220 |

FOREIGN PATENT DOCUMENTS

| | | | | |
|---|---|---|---|---|
| WO | 9105592 | A1 | | 5/1991 |
| WO | WO 9105592 | A1 | * | 5/1991 |

* cited by examiner

FIG. 1 (Canceled)
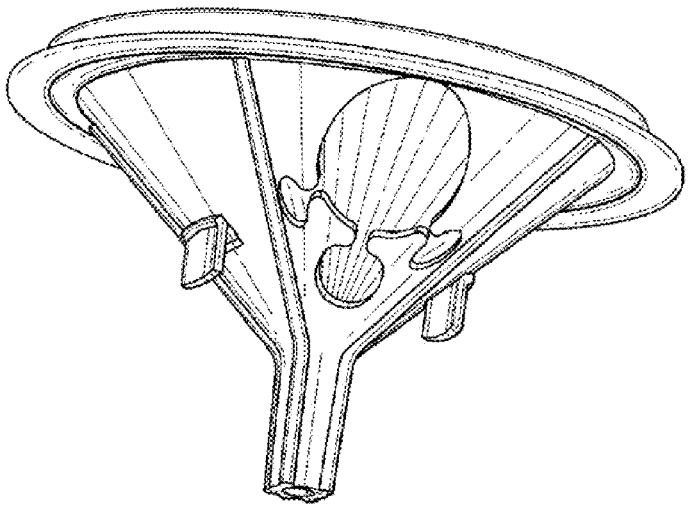

FIG. 2 (Canceled)
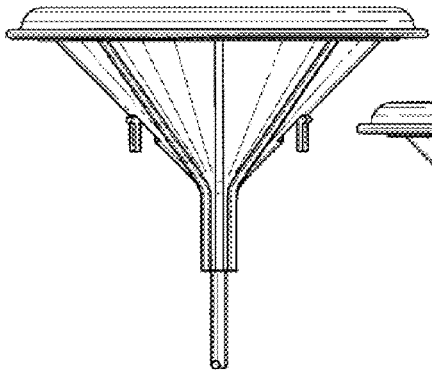
FIG. 3 (Canceled)
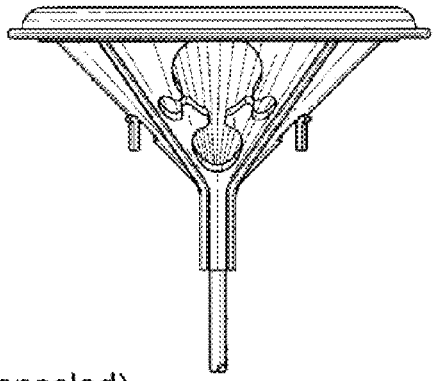
FIG. 4 (Canceled)
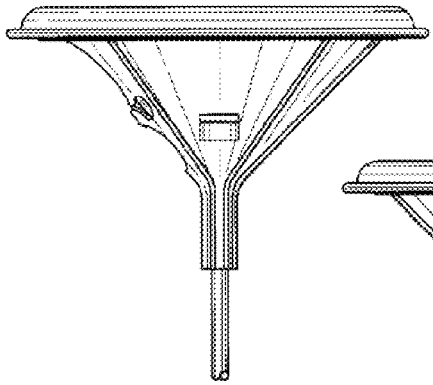
FIG. 5 (Canceled)
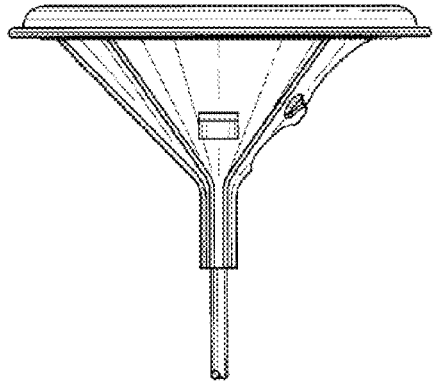

FIG. 6 (Canceled)
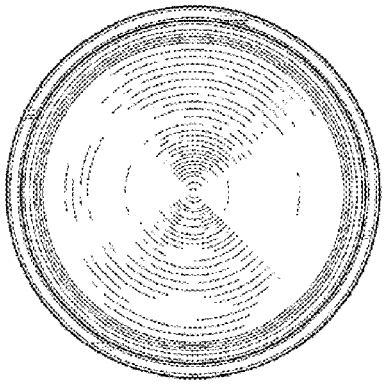
FIG. 7 (Canceled)
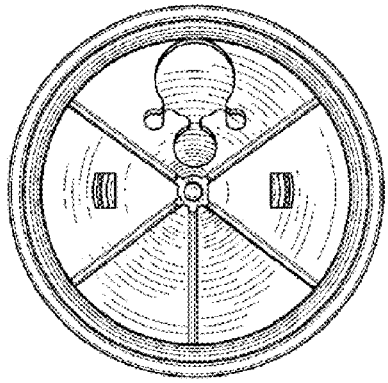
FIG. 8
(Canceled)
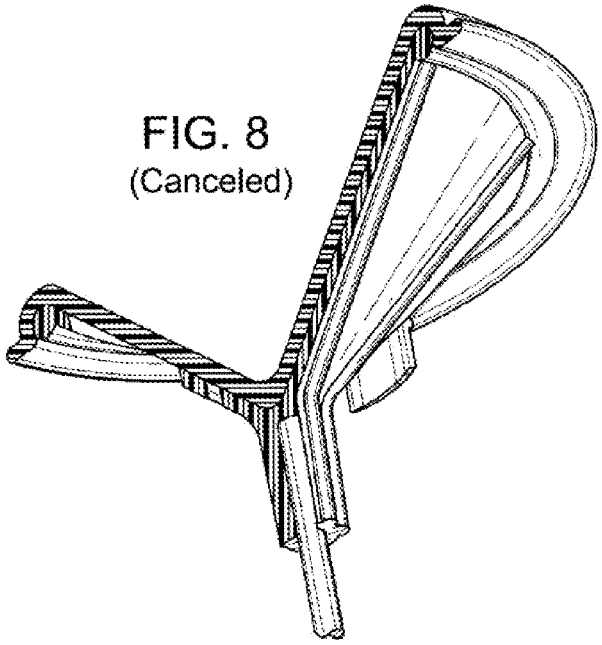

FIG. 9 (NEW)
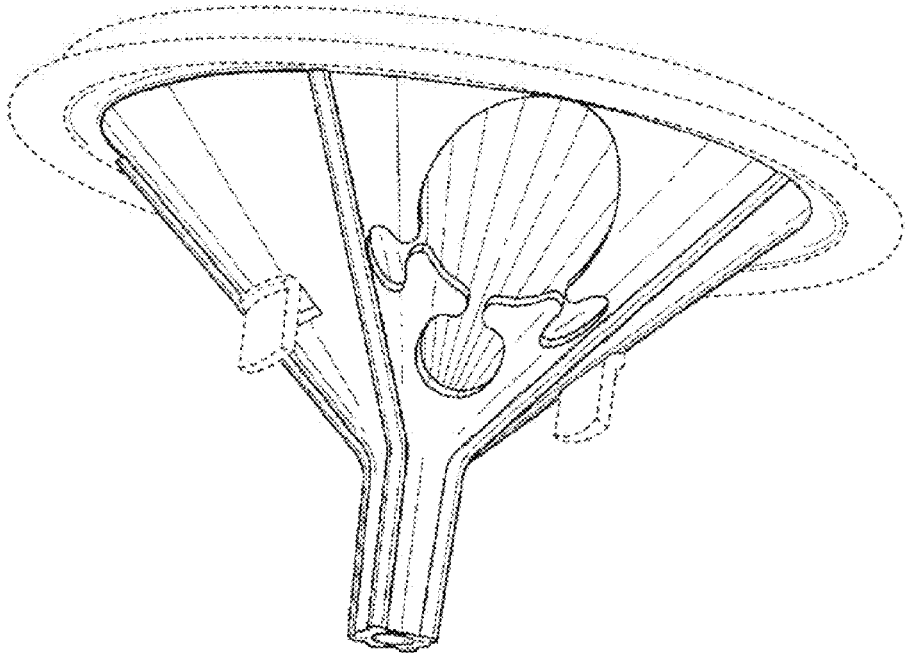

FIG. 10 (NEW)
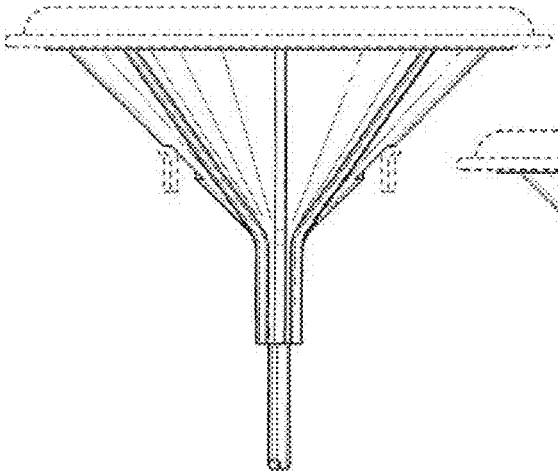
FIG. 11 (NEW)
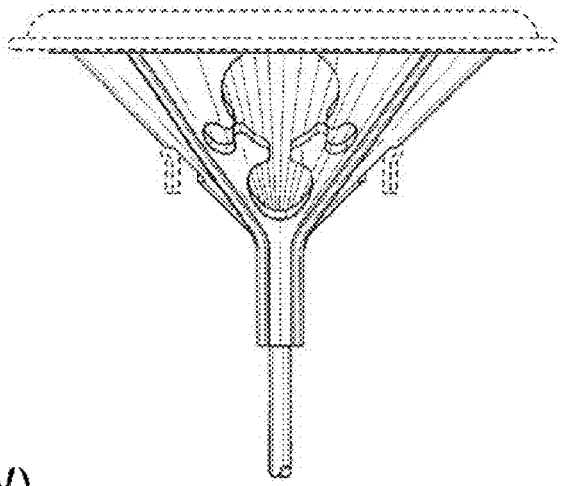
FIG. 12 (NEW)
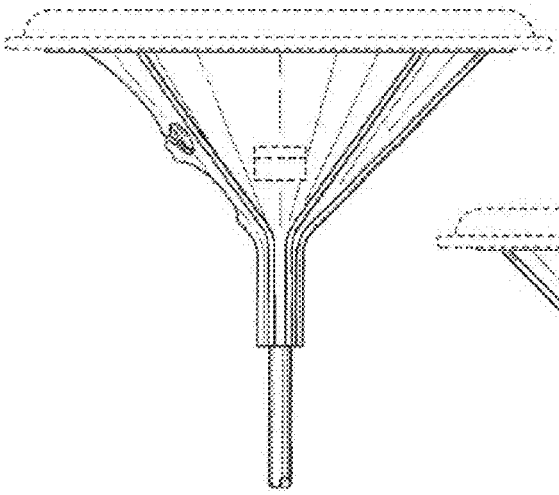
FIG. 13 (NEW)
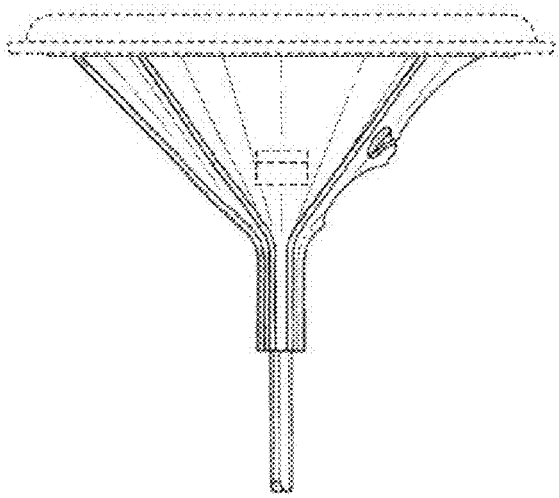

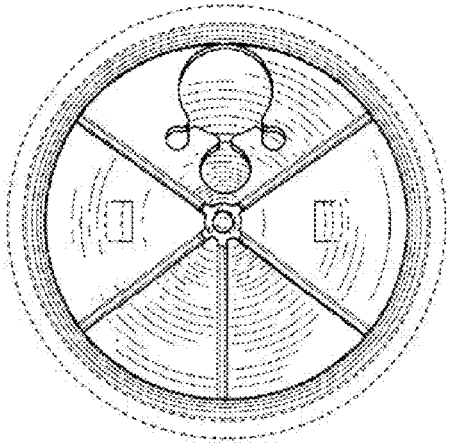

FIG. 14 (NEW)
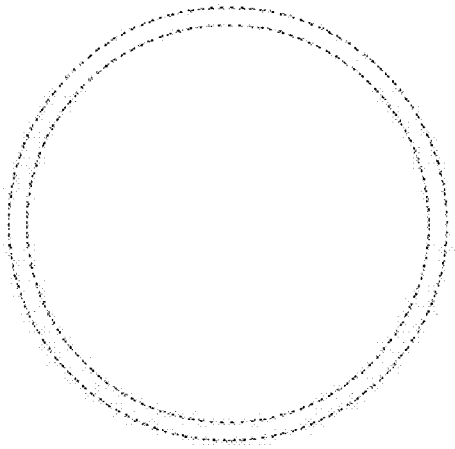
FIG. 15 (NEW)